G. D. ROLLINS.
METALLIC PACKING.
APPLICATION FILED DEC. 11, 1908.

1,000,757.

Patented Aug. 15, 1911.

WITNESSES
S. M. Gallagher.
H. Burton

INVENTOR
George D. Rollins
BY
W. Preston Williamson
ATTORNEY

UNITED STATES PATENT OFFICE.

GEORGE D. ROLLINS, OF PHILADELPHIA, PENNSYLVANIA.

METALLIC PACKING.

1,000,757.

Specification of Letters Patent.  Patented Aug. 15, 1911.

Application filed December 11, 1908. Serial No. 466,962.

*To all whom it may concern:*

Be it known that I, GEORGE D. ROLLINS, a citizen of the United States, residing at Philadelphia, in the county of Philadelphia and State of Pennsylvania, have invented a certain new and useful Improvement in Metallic Packing, of which the following is a specification.

My invention relates to a new and useful improvement in metallic packing, and has for its object to so construct such a packing as to provide for the holding back of the water and high pressure of the steam in the cylinder from the compressible rings, thus relieving said rings of the strain and consequent wear which takes place upon such rings of metallic packing as now constructed, and a secondary object of my invention is to provide for drawing off any water which may accumulate from condensation beyond the packing rings.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1:
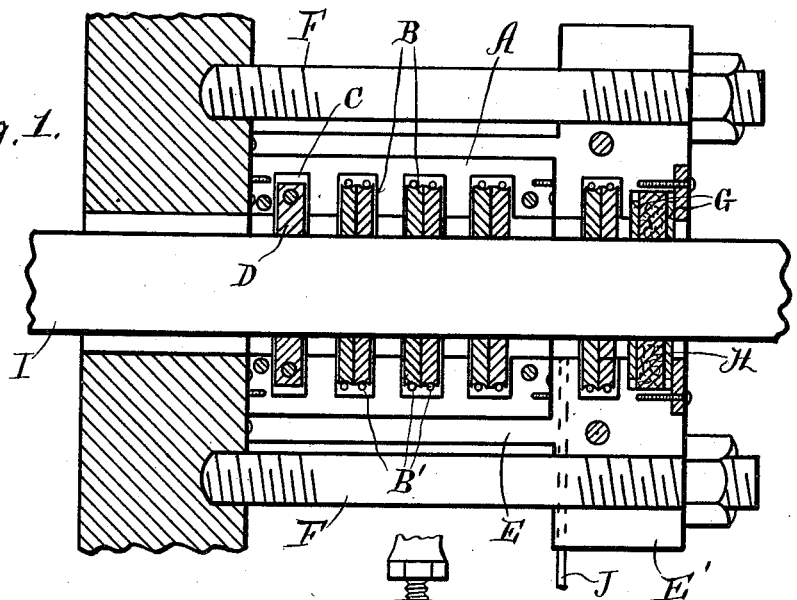
Figure 2:
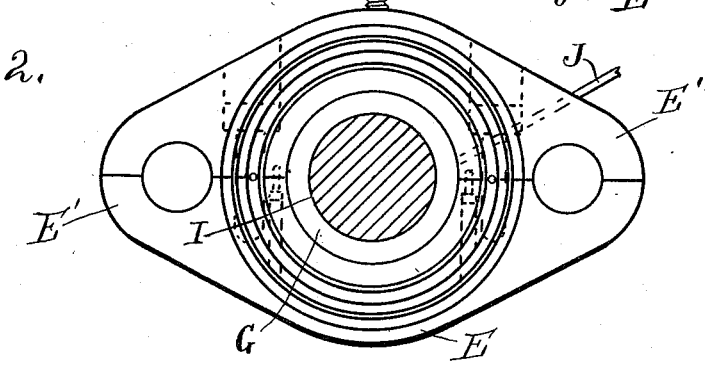
Figure 3:
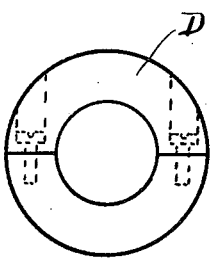

Figure 1 is a section of my improved packing. Fig. 2, an end view thereof looking outward. Fig. 3, a detail view of the reduction ring.

In carrying out my invention as here embodied, A represents the inner casing, which may be made of two sections and secured together by suitable screws, and this casing has grooves formed therein for the reception of the compressible packing rings B, which rings are of usual construction having springs B' surrounding the same for drawing them toward the rod I. A groove C similar to the groove in which the rings B are fitted is also formed in the casing, and in this groove I fit a non-compressible ring D through which the rod I passes, and the diameter of this ring is smaller than the diameter of its groove in order that it may have a certain amount of play at right angles to the rod to accommodate any vibration of said rod. This ring which I call a baffle ring may be either made in two sections as clearly shown in Fig. 3 and secured together by suitable screws for convenience in placing it around the rod, or it may be made in a single piece and passed over the end of the rod during the assembling of the engine. In the construction here shown I use an outer casing E which may be made in two sections pivoted longitudinally, and this outer casing has a flange E' through which the stud bolts F are passed for holding it in place and consequently hold the inner casing in place. In a groove formed in the outer end of the outer casing I place two plates G between which is located fibrous material H for applying a certain amount of lubricant to the rod and preventing the outflow of any water which may be formed by condensation between this point and the compressible rings, which water may be drawn off through any suitable outflow such as indicated at J.

In practice I have found that the use of the baffle ring D so relieves the compressible rings of pressure as to greatly increase their utility and permits this form of packing to be used where it would otherwise be impracticable. I am aware that supporting rings have been used inside of the compressible rings in metallic packing, but such rings being made stationary in the casing would naturally be more or less worn by the vibrations of the rod, thus permitting a comparatively free passage of steam from the cylinder to the compressible rings at high pressure, but by giving this baffle ring free movement at right angles to the piston rod this wear is avoided and a close fit to the rod is maintained, thus causing this ring to take the first shock and pressure of the steam, thereby relieving the compressible rings from excess pressure.

Having thus fully described my invention, what I claim as new and useful, is—

1. A metallic packing consisting of an outer casing, an inner casing of one diameter, the latter having a number of circular grooves of the same diameter formed therein, compressible rings fitted in certain of said grooves, and a non-compressible ring fitted in the groove next the cylinder so as to slide against the side walls of said groove as specified.

2. A metallic packing consisting of an inner casing having grooves formed therein, compressible rings fitted in certain of said grooves, a non-compressible ring fitted in one of said grooves next the cylinder and adapted to have a sidewise movement in said groove, means for preventing the escape of the water of condensation and a passage through which said water may be drawn off, as specified.

3. A metallic packing consisting of an outer casing, an inner casing of one diameter, the latter having a number of circular grooves of the same diameter formed therein, compressible rings fitted in certain of said grooves, a non-compressible ring fitted in the groove next the cylinder so as to slide against the side walls of said groove, compressible rings fitted in a groove in the outer casing for preventing the escape of water of condensation, and means for drawing off said water as specified.

In testimony whereof, I have hereunto affixed my signature in the presence of two subscribing witnesses.

GEORGE D. ROLLINS.

Witnesses:
EDW. W. ANSTICE,
S. M. GALLAGHER.

Copies of this patent may be obtained for five cents each, by addressing the "Commissioner of Patents, Washington, D. C."